No. 648,464. Patented May 1, 1900.
G. W. MOWRY.
MEANS FOR INFLATING PNEUMATIC TIRES.
(Application filed May 3, 1899.)
(No Model.)
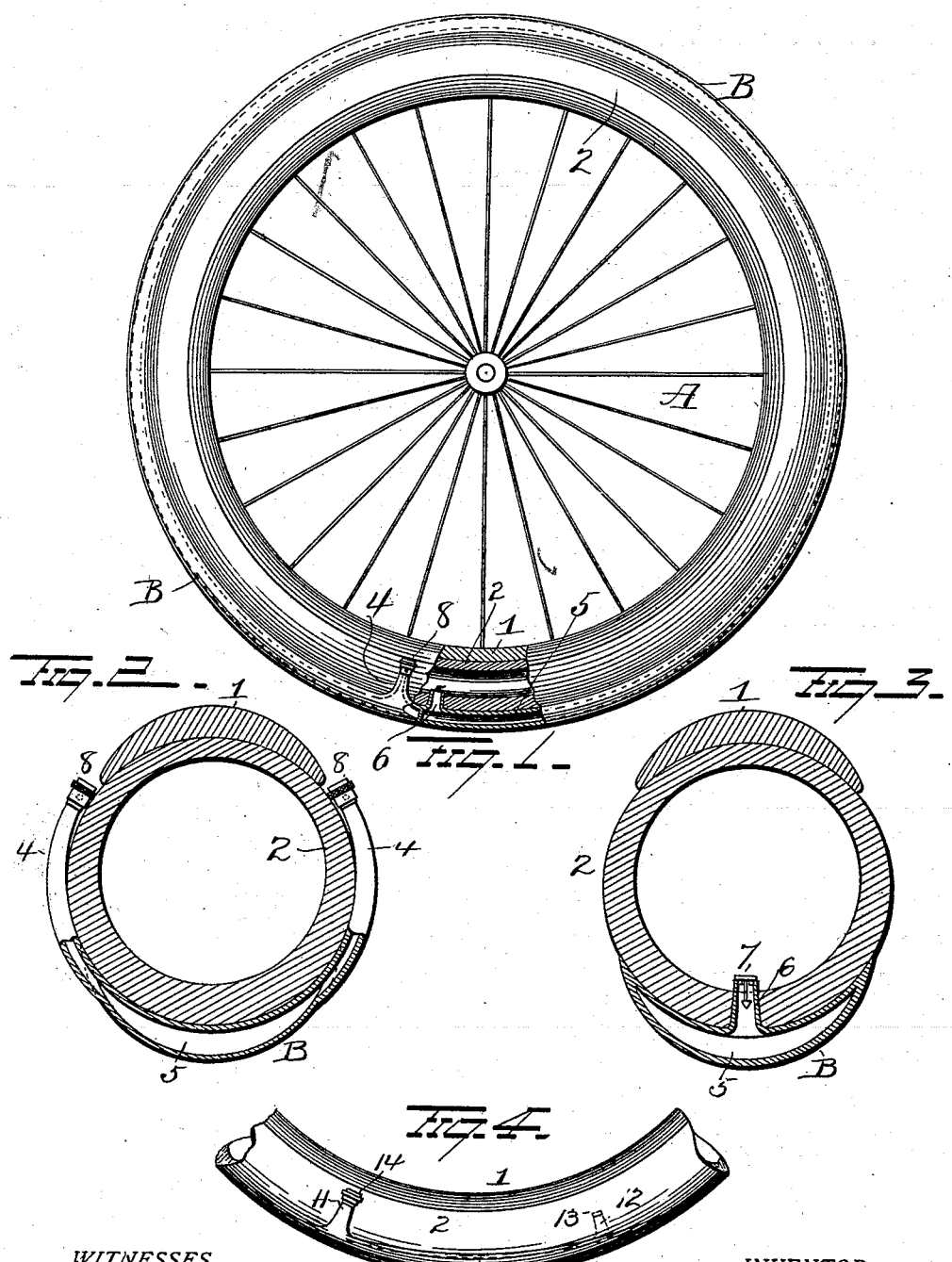
WITNESSES
INVENTOR
G. W. Mowry
Attorney

UNITED STATES PATENT OFFICE.

GEORGE WILLIAM MOWRY, OF ROCHESTER, NEW YORK.

MEANS FOR INFLATING PNEUMATIC TIRES.

SPECIFICATION forming part of Letters Patent No. 648,464, dated May 1, 1900.

Application filed May 3, 1899. Serial No. 715,470. (No model.)

*To all whom it may concern:*

Be it known that I, GEORGE WILLIAM MOWRY, a resident of Rochester, in the county of Monroe and State of New York, have invented certain new and useful Improvements in Means for Inflating Pneumatic Tires; and I do hereby declare the following to be a full, clear, and exact description of the invention, such as will enable others skilled in the art to which it appertains to make and use the same.

My invention relates to an improvement in means for inflating pneumatic tires, one object of the invention being to provide means for inflating a tire which will be automatic in its operation and which will form a part of the tire itself.

A further object is to provide an inflating-tube which may be provided on any approved pneumatic tire and which can be readily removed therefrom when desired.

A further object is to provide a device of the above-mentioned character which will be simple in construction, cheap to manufacture, neat in appearance, and most effectual when in use.

With these objects in view the invention consists in certain novel features of construction and combinations and arrangements of parts, as will be more fully hereinafter described, and pointed out in the claims.

In the accompanying drawings, Figure 1 is a view illustrating my improvements. Figs. 2 and 3 are views in section of the same, and Fig. 4 is a view of a modified form of my invention.

A represents an ordinary wheel, having a rim 1 thereon of any approved material, and 2 represents a tire, preferably of the single-tube variety, disposed around the rim 1.

My improved inflating-tube B is disposed around the tire 2 and is made, preferably, concavo-convex in cross-section and fits tightly around the tire and may be cemented or otherwise secured thereto, if desired. The tube B is provided at one end, at diametrically-opposite points, with inwardly-projecting tubes 4, terminating in proximity to the rim of the wheel and communicating with a passage or channel 5 in the tube. The passage or channel 5 extends from the tubes 4 around the tube B to a point in proximity to the tubes 4 and is provided on its end with an inwardly-projecting tube 6, passing through the tire 1 and provided with any suitable valve 7 to prevent the escape of air from the tire. Any suitable valve 8 may be provided for the inlet-tubes 4 to prevent the entrance of air when the tire is inflated.

The operation of my improved device is as follows: Air is admitted to the tube B through the inlets 4, and as the wheel revolves the tube will be compressed and force air around said tube and into the tire through the tube 6. This operation is repeated until the tire is inflated, when the valves 8 can be operated to close the inlet-tubes 4 and prevent too great pressure of air in the tire.

Instead of constructing my improved device as above described I might make the same as shown in Fig. 4. In this form of my invention I provide a concavo-convex section of tire or tube 9, secured to the tire 2 and provided with inclined or beveled ends to prevent jar when coming in contact with the ground. The section of tube or tire 9 is provided with an air-chamber 10 and air-inlet tubes 11, communicating therewith and disposed one on each side of the tire 2. A tube 12, having any approved valve 13 on its end, connects the air-chamber 10 with the interior of the tire. The inlet-tubes 11 are provided with any approved valve 14 to close said tubes when the tire 2 is fully inflated.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a pneumatic tire, of a tube extending around the outside thereof, said tube having two transversely-curved walls struck from different centers so as to be crescent-shaped in cross-section and embracing the tread of the tire transversely, tubes communicating with the first-mentioned tube and embracing the sides of the tire and each provided with a valved inlet and a valved outlet communicating with the first-mentioned tube and with the interior of the tire.

2. The combination with a pneumatic tire, of a tube having two transversely-curved walls struck from different centers so as to be crescent-shaped in cross-section, said tube embracing the tread of the tire transversely, inwardly-projecting tubes communicating with said crescent-shaped tube, embracing the tire and terminating in proximity to the rim of the wheel, said inwardly-projecting tubes provided at their free ends with inlet-valves, a short tube communicating with said crescent-shaped tube and projecting transversely through the wall of the tire and a valve in said last-mentioned tube.

In testimony whereof I have signed this specification in the presence of two subscribing witnesses.

GEORGE WILLIAM MOWRY.

Witnesses:
 WM. J. MCPHERSON,
 JOHN C. RYAN.